United States Patent
Deshpande et al.

(10) Patent No.: US 8,971,888 B2
(45) Date of Patent: Mar. 3, 2015

(54) CELL SELECTION AND RESELECTION IN DEPLOYMENTS WITH HOME NODEBS

(75) Inventors: Manoj M. Deshpande, San Diego, CA (US); Sanjiv Nanda, Ramona, CA (US); Jen Mei Chen, San Diego, CA (US); Francesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1146 days.

(21) Appl. No.: 12/400,669

(22) Filed: Mar. 9, 2009

(65) Prior Publication Data

US 2009/0238114 A1 Sep. 24, 2009

Related U.S. Application Data

(60) Provisional application No. 61/038,666, filed on Mar. 21, 2008.

(51) Int. Cl.
*H04W 4/00* (2009.01)
*H04W 48/20* (2009.01)
(Continued)

(52) U.S. Cl.
CPC ........... *H04W 48/20* (2013.01); *H04J 11/0069* (2013.01); *H04W 28/18* (2013.01); *H04W 48/12* (2013.01); *H04W 48/16* (2013.01)
USPC .................. 455/435.2; 455/435.1; 455/435.3; 455/449; 455/436; 455/437; 455/438; 455/439; 455/440; 455/441; 455/442; 455/443; 455/444; 370/328; 370/329; 370/330; 370/331

(58) Field of Classification Search
CPC ... H04W 84/045; H04W 24/02; H04W 48/20; H04W 48/16; H04W 88/08; H04W 36/08; H04W 36/04; H04W 36/14; H04W 36/30; H04W 48/02; H04W 48/18

USPC .......................... 370/332, 328–331; 455/449, 455/435.1–435.3, 436–444
See application file for complete search history.

(56) References Cited

U.S. PATENT DOCUMENTS 6,094,581 A 7/2000 Fried et al.
6,751,460 B2 * 6/2004 Korpela et al. ............... 455/449
(Continued)

FOREIGN PATENT DOCUMENTS

CN 1265814 A 9/2000
EP 2034750 A1 3/2009
(Continued)

OTHER PUBLICATIONS

International Search Report & Written Opinion—PCT/US2009/037876, International Search Authority—European Patent Office—Nov. 24, 2009.

(Continued)

*Primary Examiner* — Olumide T Ajibade Akonai
(74) *Attorney, Agent, or Firm* — Fariba Yadegar-Bandari

(57) ABSTRACT

Systems and methodologies are described that facilitate cell search, selection, and reselection within a wireless communication network that includes a home node base station (home nodeB). A user equipment (UE) can detect a home nodeB and communicate such identification to a macro network that includes at least one node base station (nodeB). The detected home nodeB and nodeB can be hierarchically structured in order to prioritize connectivity with the home nodeB over the nodeB. Such prioritization can be implemented by broadcasting home nodeB parameters and macro nodeB parameters having identification information therewith.

21 Claims, 10 Drawing Sheets

(51) Int. Cl.
*H04J 11/00* (2006.01)
*H04W 28/18* (2009.01)
*H04W 48/12* (2009.01)
*H04W 48/16* (2009.01)

(56) References Cited

U.S. PATENT DOCUMENTS

| | | | |
|---|---|---|---|
| 7,706,846 | B2 | 4/2010 | Moon |
| 8,045,981 | B2 | 10/2011 | Umatt et al. |
| 2002/0111166 | A1 | 8/2002 | Monroe |
| 2007/0097938 | A1 | 5/2007 | Nylander et al. |
| 2007/0140163 | A1 | 6/2007 | Meier et al. |
| 2007/0211669 | A1 | 9/2007 | Umatt et al. |
| 2007/0270152 | A1 | 11/2007 | Nylander et al. |
| 2008/0057912 | A1 | 3/2008 | Deprun |
| 2008/0057948 | A1 | 3/2008 | Mittal et al. |
| 2008/0108346 | A1 | 5/2008 | Umatt et al. |
| 2008/0220782 | A1* | 9/2008 | Wang et al. ............... 455/436 |
| 2008/0220784 | A1* | 9/2008 | Somasundaram et al. .... 455/437 |
| 2008/0293419 | A1* | 11/2008 | Somasundaram et al. .... 455/437 |
| 2009/0104905 | A1* | 4/2009 | DiGirolamo et al. ........ 455/434 |
| 2009/0185524 | A1* | 7/2009 | Sammour et al. ............ 370/328 |
| 2010/0323663 | A1* | 12/2010 | Vikberg et al. ............... 455/410 |

FOREIGN PATENT DOCUMENTS

| | | | |
|---|---|---|---|
| JP | 2004112148 | | 4/2004 |
| JP | 2007020049 | A | 1/2007 |
| JP | 2007221786 | A | 8/2007 |
| JP | 2007266732 | A | 10/2007 |
| JP | 2008523651 | A | 7/2008 |
| JP | 2009504047 | A | 1/2009 |
| JP | 2009510969 | A | 3/2009 |
| JP | 2009510973 | A | 3/2009 |
| KR | 20060103329 | A | 9/2006 |
| WO | WO2006061161 | A2 | 6/2006 |
| WO | 2007022429 | A2 | 2/2007 |
| WO | WO2007015066 | A2 | 2/2007 |
| WO | 2007040449 | A1 | 4/2007 |
| WO | 2007040454 | A2 | 4/2007 |
| WO | 2007103991 | A2 | 9/2007 |
| WO | WO2008001452 | | 1/2008 |

OTHER PUBLICATIONS

Motorola: "Identification and Measurement of CSG cells" 3GPP Draft; R2-081114, 3rd Generation Partnership Project (3GPP), Mobile Competence Centre ; 650, Route Des Lucioles ; F-06921 Sophia-Antipolis Cedex; France, vol. RAN WG2, No. Sorrento, Italy; 20080211, Feb. 4, 2008, XP050138898 the whole document.
Panasonic: "CSG cell handover" 3GPP Draft; R2-080884_CSG Cell Handover, 3rd Generation Partnership Project (3GPP), Mobile Competence Centre; 650, Route Des Lucioles; F-06921 Sophia-Antipolis Cedex ; France, vol. RAN W62, No. Sorrento, Italy; 20080211, Feb. 5, 2008., XP050138693 the whole document.
"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.3.0 Release 8); ETSI TS 136 300"ETSI Standards, Lis, Sophia Antipolis Cedex, France, vol. 3-R2, No. V8.3.0, Jan. 1, 2008, XP014040735 ISSN: 0000-0001 paragraphs 5.1.7.3, 7.4, 8.2, 10, 10.1.1.1, 10.1.2.1.1, 10.1.3, 10.5.1.1, 10.5.1.2, 22.2, C.I, C.I.I, C.1.2, C.1.3, C.Z.I, £.1.5, £.1.7 and F.2.
Taiwan Search Report—TW098114649—TIPO—Jul. 24, 2013.
Motorol: "SCH identity assignment of CSG cells" 3GPP Draft; R2-074438, 3rd Generation Partnership Project (3GPP), Mobile Competence Centre ; 650, Route Des Lucioles ; F-06921 Sophia-Antipolis Cedex ; France, vol. RAN WG2, No. Shanghai, China; 20071008, Oct. 2, 2007, XP050136992, p. 1, line 9-line 13.
QUALCOMM Europe: "Measurement and mobility issues for home (e)Node Bs" 3GPP Draft; R2-074117, 3rd Generation Partnership Project (3GPP), Mobile Competence Centre ; 650, Route Des Lucioles ; F-06921 Sophia-Antipolis Cedex: France, vol. RAN WG2, No. Shanghai, China; 20071008, Oct. 1, 2007, XP050136747 the whole document.
QUALCOMM Europe: "Restricted Association for HNBs" 3GPP Draft: R2-074406, 3rd Generation Partnership Project (3GPP), Mobile Competence Centre ; 650, Route Des Lucioles ; F-06921 Sophia-Antipolis Cedex ; France, vol. RAN WG2, No. Shanghai, China; 20071008, Oct. 1, 2007, XP050136972 the whole document.
"Univeral Mobile Telecommunications System (UMTS); User Equipment (UE) procedures in idle mode and procedures for cell reselection in connected mode (3GPP TS 25.304 version 7.4.0 Release 7); ETSI TS 125 304" ETSI Standards, Lis, Sophia Antipolis Cedex, France, vol. 3-R2, No. V7.4.0, Jan. 1, 2008, XP014040625 ISSN: 0000-0001 paragraphs 4.1. 5.1.1. 5.2.6.1.2 and 5.2.6.1.4.
Qualcomm Europe, "Restricted Association for HNBs," 3GPP Draft, TSG-RAN WG2 #59bis, Jeju, China, R2-075125, Nov. 12, 2007, pp. 1-6.
TSG-RAN WG2, "RAN2 input to TR 25.820," 3GPP Draft, TSG-RAN WG2 Meeting #60, Jeju, Korea, R2-075466, Nov. 19, 2007, p. 5.
Huawei: "Report of the email discussion legacy mobiles hNB", 3GPP TSG-RAN WG2 #59bis R2-074499 Oct. 8-12, 2007, pp. 1-5.
Nokia Siemens Networks: "3G Home NodeB Access Control," 3GPP TSG-RAN WG2 Meeting #60bis, R2-080290, Jan. 14-18, 2008, pp. 1-3.
Panasonic, "CSG Cell Prioritization by UE", 3GPP TSG RAN WG2 #59 R2-073282, Aug. 20, 2007.
Qualcomm Europe, "Cell Selection/Reselection in Deployments with Home NodeBs" [online], R2-081820, 3GPP TSG-RAN WG2#61bis, ,Mar. 25, 2008, pp. 1-3, <URL:http://www.3gpp.org/ftp/tsg_ran/WG2_RL2/TSGR2_61bis/ Docs/R2-081820.zip>.
Teliasonera: "Multiple PLMN identities in shared networks," 3GPP TSG-RAN2 Meeting #43, R2-041512, Aug. 16-20, 2004, pp. 1-7.
T-Mobile et al., Discovery of and mobility to CSG cells, 3GPP TSG RAN2#59bis, R2-073919, Oct. 8-12, 2007, pp. 1-3.

* cited by examiner

CELL SELECTION AND RESELECTION IN DEPLOYMENTS WITH HOME NODEBS

CLAIM OF PRIORITY UNDER 35 U.S.C. §119

The present Application for Patent claims priority to Provisional Application No. 61/038,666 entitled "CELL SELECTION AND RESELECTION IN DEPLOYMENTS WITH HOME NODEBS" filed Mar. 21, 2008, and assigned to the assignee hereof and hereby expressly incorporated by reference herein.

BACKGROUND

1. Field

The following description relates generally to wireless communications, and more particularly to cell selection and reselection in deployments in home nodeBs.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to related aspects, a method that facilitates cell selection related to home node base stations and node base stations. The method can include utilizing a hierarchical structure to organize at least one node base station (nodeB) and at least one home node base station (home nodeB), wherein the hierarchical structure prioritizes a home nodeB over a nodeB. The method can further include receiving a portion of data related to system information block (SIB) from at least one of a nodeB and a home nodeB, wherein the SIB is configured to enable a user equipment (UE) to discover the home nodeB. The method can also include communicating a detection notification related to a home nodeB to a macro network. The method can include employing at least one of the hierarchical structure or the portion of data related to SIB to enable the UE to select between the home nodeB or the nodeB.

Another aspect relates to a wireless communications apparatus. The wireless communications apparatus can include at least one processor configured to organize at least one node base station (nodeB) and at least one home node base station (home nodeB) into a hierarchical structure that prioritizes a home nodeB over a nodeB, receive a communication that includes a system information block (SIB) from at least one of a nodeB and a home nodeB, leverage the SIB for identify the home nodeB, utilize a manual search with the UE to discover the home nodeB, evaluate a PLMN ID to identify at least one of the home nodeB or the nodeB, receive an LAC assignment to distinguish an authorized home nodeB from an unauthorized home nodeB, communicate a detection notification related to a home nodeB to a macro network, and employ at least one of the hierarchical structure, the portion of data related to SIB, the PLMN ID, the manual search, or the LAC assignment to enable the UE to select between the home nodeB or the nodeB.

Yet another aspect relates to a wireless communications apparatus that enables efficient selection for a user equipment in which a home node base station is prioritized over a node base station. The wireless communications apparatus can include means for receiving a portion of data related to at least one of a home node base station (home nodeB) or a node base station (nodeB) associated with a macro network. Additionally, the wireless communications apparatus can comprise means for evaluating the portion of data to identify a priority between a home nodeB and a nodeB. The wireless communications apparatus can include means for selecting a home nodeB for UE connectivity over a nodeB based upon the evaluation. The wireless communications apparatus can further comprise means for connecting a UE to at least one of the home nodeB or the nodeB based upon the selection.

Still another aspect relates to a computer program product comprising a computer-readable medium having stored thereon code for causing at least one computer to organize at least one node base station (nodeB) and at least one home node base station (home nodeB) into a hierarchical structure that prioritizes a home nodeB over a nodeB, code for causing at least one computer to receive a communication that includes a system information block (SIB) from at least one of a nodeB and a home nodeB, code for causing at least one computer to leverage the SIB for identify the home nodeB, code for causing at least one computer to utilize a manual search with the UE to discover the home nodeB, code for causing at least one computer to evaluate a PLMN ID to identify at least one of the home nodeB or the nodeB, code for causing at least one computer to receive an LAC assignment to distinguish an authorized home nodeB from an unauthorized home nodeB, code for causing at least one computer to communicate a detection notification related to a home nodeB to a macro network, and code for causing at least one computer to employ at least one of the hierarchical structure, the portion of data related to SIB, the PLMN ID, the manual search, or the LAC assignment to enable the UE to select between the home nodeB or the nodeB.

According to other aspects, an apparatus can include a receiver module that receives a portion of data, wherein the portion of data is at least one of a SIB for a home nodeB, a SIB for a nodeB, a PLMN ID for a home nodeB, a PLMN ID for a nodeB, a LAC for a home nodeB, or a LAC for a nodeB, a selection module that identifies at least one of a home nodeB for connectivity or a nodeB for connectivity based upon the received portion of data, the selection module communicates the identified home nodeB to a macro network, and a search module that discovers at least one home nodeB based upon a user initiated manual request, wherein the discovery leverages the portion of data.

According to other aspects, a method that facilitates efficient selection for a user equipment in which a home node base station is prioritized over a node base station. The method can include receiving a detection notification associated with a home node base station (home nodeB) from a user equipment (UE), wherein the detection notification identifies a home nodeB for connectivity. Additionally, the method can comprise organizing at least one node base station (nodeB) and the at least one home nodeB within a hierarchical structure that prioritizes connectivity for the UE to the home nodeB over the nodeB. The method can further include establishing connectivity between the UE and at least one of the home nodeB or the nodeB based upon one of the hierarchical structure.

Another aspect relates to a wireless communications apparatus. The wireless communications apparatus can include at least one processor configured to receive a detection notification associated with a home node base station (home nodeB) from a user equipment (UE), wherein the detection notification identifies a home nodeB for connectivity, organize at least one node base station (nodeB) and the at least one home nodeB within a hierarchical structure that prioritizes connectivity for the UE to the home nodeB over the nodeB, and establish connectivity between the UE and at least one of the home nodeB or the nodeB based upon one of the hierarchical structure.

Another aspect relates to a wireless communications apparatus that enables communication of the detection of a home node base station for connectivity. The wireless communications apparatus can include means for receiving a notification related to an detected home node base station (home nodeB) from a first UE. The wireless communications apparatus can further comprise means for communicating information related to the detected home nodeB to a second UE. The wireless communications apparatus can include means for leveraging a portion of data related to the detected home nodeB to distinguish the home nodeB from a nodeB. Additionally, the wireless communications apparatus can include means for enabling the UE to connect to at least one of the home nodeB or the nodeB based upon the portion of data.

Still another aspect relates to a computer program product comprising a computer-readable medium having stored thereon code for causing at least one computer to receive a detection notification associated with a home node base station (home nodeB) from a user equipment (UE), wherein the detection notification identifies a home nodeB for connectivity, code for causing at least one computer to organize at least one node base station (nodeB) and the at least one home nodeB within a hierarchical structure that prioritizes connectivity for the UE to the home nodeB over the nodeB, and code for causing at least one computer to enable connectivity between the UE and at least one of the home nodeB or the nodeB based upon one of the hierarchical structure.

According to other aspects, an apparatus can include a receiver module that receives a detected home node base station (home nodeB) from a user equipment (UE), an organizer module that utilizes a hierarchical structure to organize at least one node base station (nodeB) and at least one detected home nodeB, wherein the hierarchical structure prioritizes the detected home nodeB over a nodeB, and a transmitter module that communicates a portion of data to the UE, wherein the portion of data is at least one of a SIB for a home nodeB, a SIB for a nodeB, a PLMN ID for a home nodeB, a PLMN ID for a nodeB, a LAC for a home nodeB, or a LAC for a nodeB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
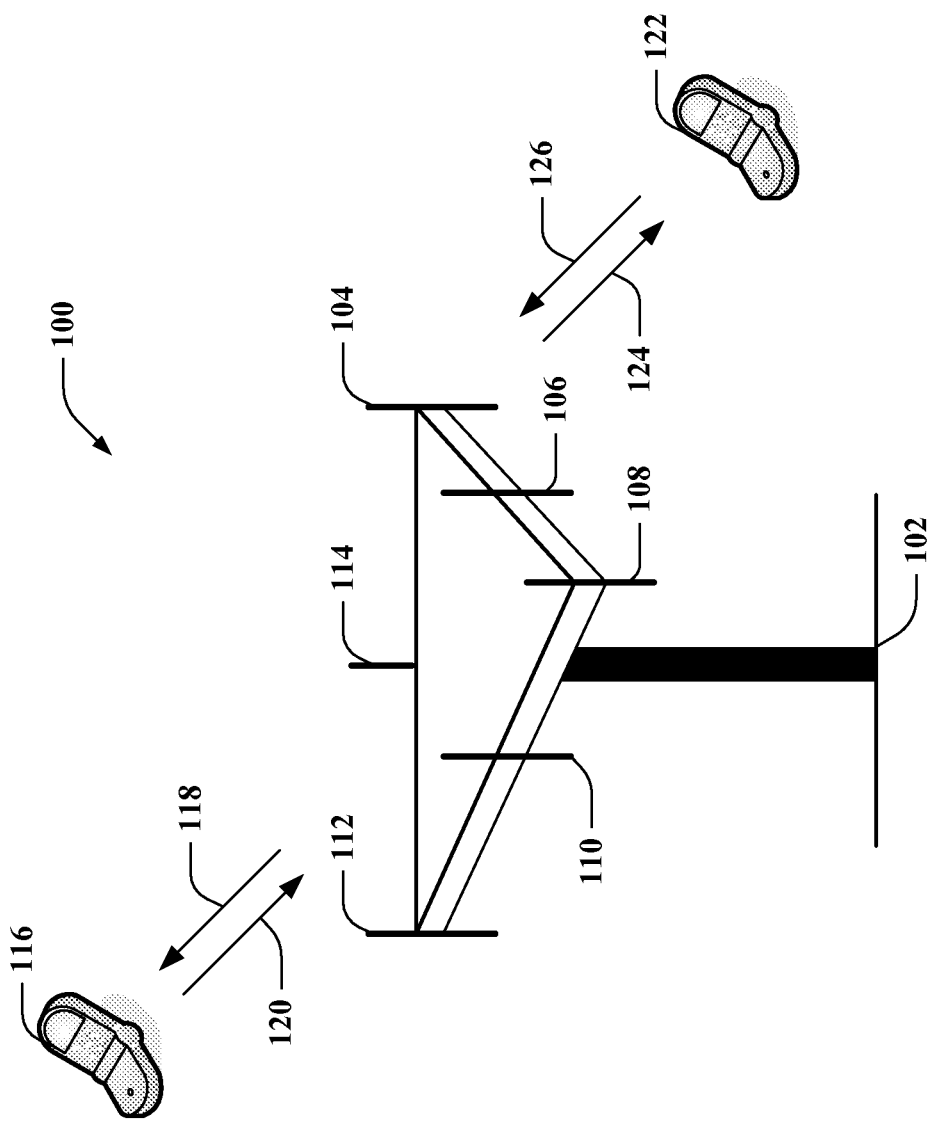
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g. to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g. the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation can, in general, enable efficient cell selection and reselection in deployments that include a home node base station (home nodeB, HNB, etc.). The claimed subject matter can provide for techniques for legacy user equipment (UE) and/or user equipment (UE) to incorporate the capability to leverage a home nodeB in addition to existing nodeBs. Thus, modifications are provided to cell selection and reselection in order to implement efficient home nodeB search, selection, and reselection. Additionally, by incorporating such modifications, the subject innovation can mitigate the impact on standby time of a UE (e.g., legacy UE, etc.) as well as a UE with no subscription to a home nodeB.

The claimed subject matter can employ at least one of the following modifications in order to optimize cell search, selection, and/or reselection: a manual search for a home nodeB; system information block (SIB) configuration for UE, wherein SIB on a macro network (that includes the nodeB) and SIB on a home nodeB can facilitate discovery for the UE; a hierarchical cell structure for prioritization of a home nodeB over a nodeB; separate public land mobile network identification (PLMN ID) for home nodeBs and nodeBs, wherein the PLMN ID can be utilized to prioritize a home nodeB over a macro network (that includes the nodeB); location area code assignment (LAC) for home nodeBs and nodeBs, wherein the LAC assignment can distinguish a home nodeB from a nodeB; UE based learning to leverage home nodeBs that the UE had previously connected in order to efficient connect to such previous home nodeBs; or broadcast of scrambling codes that can be utilized to distinguish a home nodeB from a nodeB.

Figure 2:
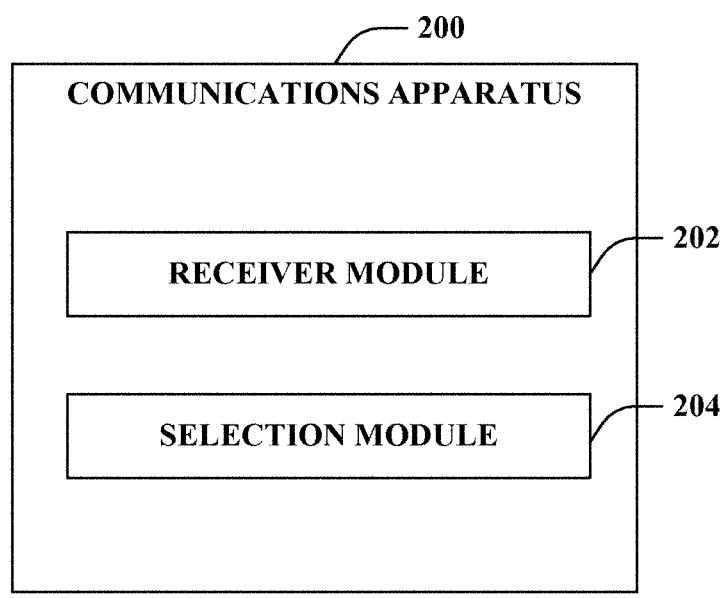
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a user equipment (UE) or a portion thereof, a mobile device or a portion thereof, or substantially any communications apparatus that receives data transmitted in a wireless communications environment. In communications systems, the communications apparatus 200 employ components described below to configure the communications apparatus 200 to report the UPH measurement during a reduced measurement period that is less than 100 ms.

The communications apparatus 200 can include receiver module 202 that can receive a portion of data, wherein the portion of data is at least one of a system information block (SIB) type for a home nodeB, a SIB for a nodeB, a public land mobile network identification (PLMN ID) for a home nodeB, a PLMN ID for a nodeB, a location area code (LAC) for a home nodeB, or a LAC for a nodeB. Moreover, the receiver module 202 can receive communications from at least one home nodeB, wherein the communications can enable detection of such home nodeB.

The communications apparatus 200 can further include a selection module 204 that can communicate the identified home nodeB to a macro network and/or a nodeB, wherein the macro network and/or the nodeB can communicate the detected home nodeB to disparate user equipment (UE). The selection module can further identify at least one of a home nodeB for connectivity or a nodeB for connectivity based upon the received portion of data.

Moreover, although not shown, it is to be appreciated that communications apparatus 200 can include memory that retains instructions with respect to utilizing a hierarchical structure to organize at least one node base station (nodeB) and at least one home node base station (home nodeB), wherein the hierarchical structure prioritizes a home nodeB over a nodeB, receiving a portion of data related to system information block (SIB) from at least one of a nodeB and a home nodeB, wherein the SIB is configured to enable a user equipment (UE) to discover the home nodeB, communicating a detection notification related to a home nodeB to a macro network, employing at least one of the hierarchical structure or the portion of data related to SIB to enable the UE to select between the home nodeB or the nodeB, and the like. Moreover, the memory can retain instructions with respect to utilizing a manual search with the UE to discover the home nodeB, controlling a search for the home nodeB and selection of the home nodeB with a mobility factor and a penalty timer, receiving a first public land mobile network identification (PLMN ID) allocation for the home nodeB and a second public land mobile network identification identification (PLMN ID) allocation for a macro network that includes the nodeB, wherein the first PLMN ID allocation is prioritized over the second PLMN ID allocation, utilizing the first PLMN ID allocation and the second PLMN ID allocation to select between the home nodeB or the nodeB, dynamically updating two or more equivalent PLMN ID's to enable the UE to search for a home nodeB, receiving a location area code (LAC) assignment, wherein the LAC assignment is employed to distinguish an authorized home nodeB from an unauthorized home nodeB, receiving a PLMN ID for a selected home nodeB, wherein the UE established connectivity with the selected home nodeB, tracking the PLMN ID associated with the selected home nodeB, utilizing the tracked PLMN ID to select between a first home nodeB and a second home nodeB, connecting to at least one of the first home nodeB and the second home nodeB based upon the tracked PLMN ID, receiving a scrambling code associated with a home nodeB, receiving a scrambling code associated with a nodeB, evaluating a received scrambling code to identify a new SIB or an existing SIB, utilizing the evaluation to search for a nodeB, utilizing the evaluation to prevent a search for a home nodeB, and the like.

Furthermore, it is to be appreciated that communications apparatus 200 can include memory that retains instructions with respect to receiving a detection notification associated with a home node base station (home nodeB) from a user equipment (UE), wherein the detection notification identifies a home nodeB for connectivity, organizing at least one node base station (nodeB) and the at least one home nodeB within a hierarchical structure that prioritizes connectivity for the UE to the home nodeB over the nodeB, establishing connectivity between the UE and at least one of the home nodeB or the nodeB based upon one of the hierarchical structure, and the like. Moreover, the memory can retain instructions with respect to transmitting a portion of data related to a home nodeB system information block (SIB) and a portion of data related to a nodeB SIB, establishing connectivity between the UE and at least one of the home nodeB or the nodeB based upon the portion of data, communicating a public land mobile network identification (PLMN ID) related to a home nodeB and a PLMN ID related to a nodeB, establishing connectivity between the UE and at least one of the home nodeB or the nodeB based upon one the PLMN ID related to the home nodeB and the PLMN ID related to the nodeB, communicating a location area code (LAC) assignment for a home nodeB and a LAC assignment for a nodeB, establishing connectivity between the UE and at least one of the home nodeB or the nodeB based upon one the LAC assignment for the home nodeB and the LAC assignment for the nodeB, and the like. Further, communications apparatus 200 can include a processor that may be utilized in connection with executing instructions (e.g. instructions retained within memory, instructions obtained from a disparate source, . . . ).

Figure 3:
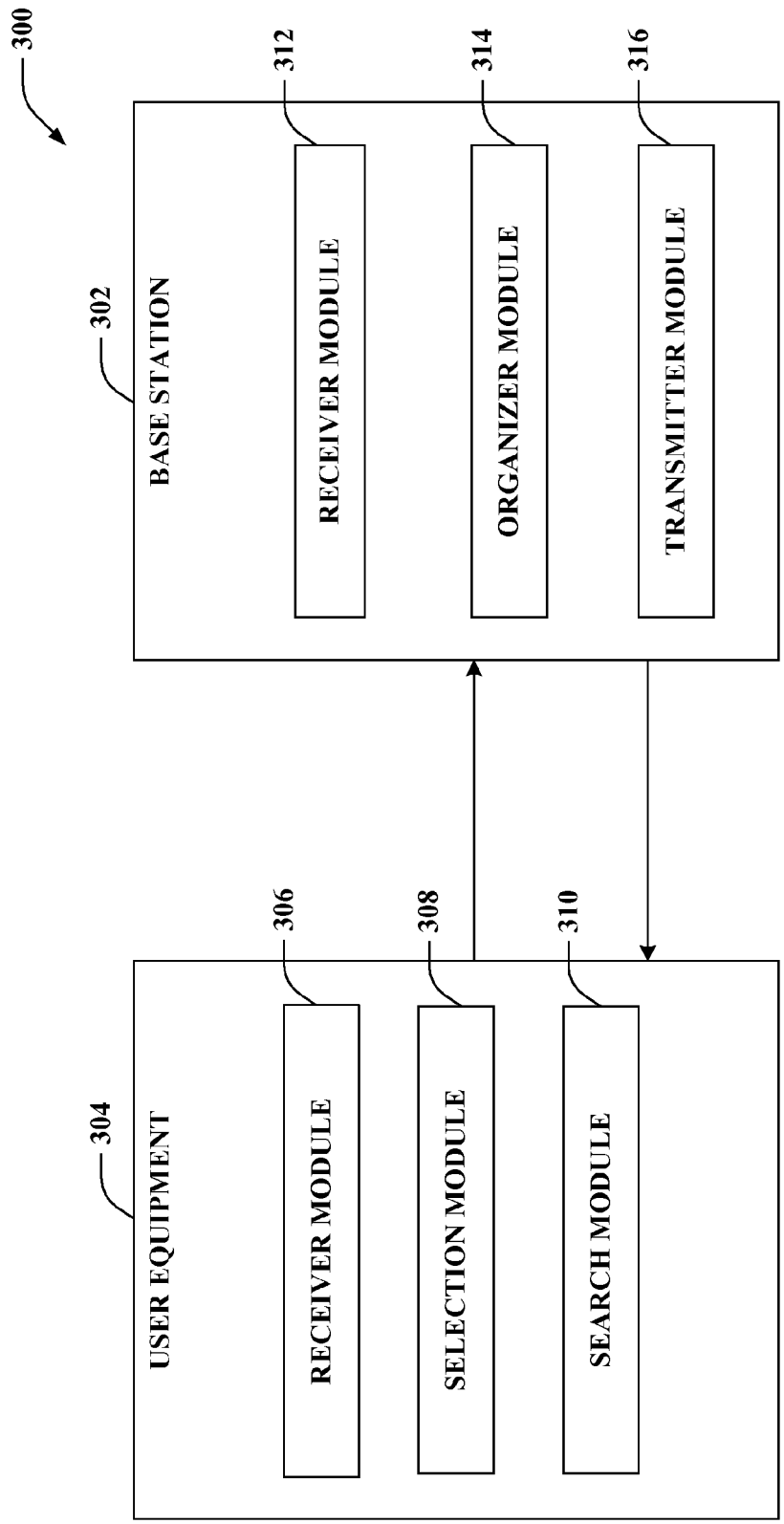
FIG. 3 is an illustration of an example wireless communications system that facilitates cell selection related to home node base stations and node base stations.

Now referring to FIG. 3, illustrated is a wireless communications system 300 that facilitates cell selection related to home node base stations and node base stations. The system 300 includes a base station 302 that communicates with a user equipment (UE) 304 (and/or any number of disparate communication apparatus (not shown)). Base station 302 can transmit information to UE 304 over a forward link channel; further base station 302 can receive information from UE 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the UE 304 as well and vice versa, in one example; the configuration depicted excludes these components for ease of explanation.

UE 304 can include a receiver module 306 that can receive a portion of data related to at least one of a home nodeB, a nodeB, or a macro network that includes a nodeB. The portion of data and be, but is not limited to being, a SIB for a home nodeB, a SIB for a nodeB, a PLMN ID for a home nodeB, a PLMN ID for a nodeB, a LAC for a home nodeB, or a LAC for a nodeB. The receiver module 306 can further receive information related to a detected home nodeB.

The UE 304 can further include a selection module 308 that can enable a selection for a cell (e.g., a nodeB, a home nodeB, etc.) for the UE 304. In general, the UE 304 can leverage the received portion of data in order to identify at least one of a home nodeB or a nodeB for connectivity. In general, the received portion of data can provide home nodeB parameters and macro nodeB parameters, wherein the home nodeB parameters can be prioritized.

The UE 304 can further include a search module 310 that can enable a manual search in order to detect a home nodeB. For example, a manual search can be initiated by a user request, wherein the search module 310 can detect any suitable home nodeB within a predefined proximity or signal range.

Base station 302 can include a receiver module 312 that can receive a communication from the UE 304 that identifies a detected home nodeB. In other words, the UE can detect a home nodeB and the receiver module 312 can receive information related to such detected home nodeB (e.g., home nodeB parameters, etc.).

Base station 302 can include an organizer module 314 that can hierarchically structure or arrange the priority of connectivity in which a detected home nodeB can be preferred over a nodeB or macro nodeB. In general, the organizer module 314 can broadcast home nodeB parameters and macro nodeB parameters, wherein the home nodeB parameters can be distinguishable and prioritized over the macro nodeB parameters.

Additionally, the base station 302 can include a transmitter module 316 that can broadcast the home nodeB parameters and the macro nodeB parameters, wherein the home nodeB parameters can be communicated to disparate UEs that have not discovered or are unaware of the home nodeBs within proximity or range. The transmitter 316 can broadcast or communicate portions of data related to the parameters for home nodeBs or the macro nodeBs, wherein the portion of data is at least one of a SIB for a home nodeB, a SIB for a nodeB, a PLMN ID for a home nodeB, a PLMN ID for a nodeB, a LAC for a home nodeB, or a LAC for a nodeB.

In general, the subject innovation can modify cell search, cell selection, and cell reselection techniques in connection with home nodeBs. The innovation can mitigate the impact on standby time of a legacy UE as well as UEs with no subscription to any home nodeB. A manual search can be implemented in order to allow a UE to identify a home nodeB within a pre-defined proximity or range. In addition, the subject innovation can modify neighbor set configuration, wherein SIB type can be configured on a macro network and a home nodeB in order to enable the UE to prioritize the home nodeB over the macro network (and including nodeBs). For example, SIB3 and SIB11 on the macro nodeB as well as the home nodeB can be configured to assist the UE to discover the home nodeB. Once discovered, the UE can prioritize the home nodeB over the macrocell.

Moreover, the claimed subject matter can implement a hierarchy of cells, wherein the hierarchy of cells can prioritize a home nodeB over a macro nodeB. Both mobility criterion and penalty timer can control home nodeB search and cell reselection. Additionally, the subject innovation can prioritize a home nodeB over a nodeB or macro nodeB by leveraging PLMN ID. Separate PLMN ID allocation for macro network and home nodeB networks can prioritize a home nodeB over a macro nodeB. Further, equivalent PLMN IDs can be updated dynamically in order to adjust searching for the home nodeB. Moreover, LAC allocation can be leveraged in order to allow the UE to distinguish an authorized home nodeB from an unauthorized home nodeB.

The subject innovation can further provide UE based learning, wherein the UE can prioritize a search for recently utilized PLMN to reduce latency and curen drain for system selection. The UE can store, record, maintain a list, or remember a set of home nodeBs that it has connected (e.g., recently used). Further after a first discovery, the UE can leverage such set of home nodeBs to maintain or record relevant information for efficient home nodeB discovery at a later time. Additionally, the subject innovation can mitigate the impact on UEs that are not authorized on any home nodeB. A scrambling code allocated to home nodeBs can be utilized to distinguish those assigned to macro nodeBs in the neighbor list and broadcast a new SIB or an existing SIB. The LAC allocation can further be utilized to allow the UE to distinguish an authorized home nodeB from an unauthorized home nodeB. Similarly, for the hierarchical cells approach, a distinct high priority can be reserved for the home nodeB. With such distinction, a UE can be prevented from implementing home nodeB discovery and may not search for a home nodeB.

A study on legacy Home NodeB (HNB) support for UTRA concluded that the presently available mechanisms for legacy UE mobility for UTRA HNB deployments appear not to be optimal and hence may require modification for efficient support of cell reselection in the presence of HNBs or Femto cells. Thus, it would be advantageous to identify the interaction between the possible HNB deployment scenarios and provide enhancements required for cell selection/reselection in the presence of HNBs.

There can be various deployment embodiments. HNB deployment embodiments may be distinguished by many categories, such as, for example, association model (closed/open subscriber group), relationship between the HNB spectrum and the macro network spectrum, network architecture, etc. From the HNB cell reselection perspective the following two categories can be related: Association model: The supported association models include open association (e.g., open access), closed subscriber group (CSG e.g., restricted association). Open association allows any subscriber to camp onto any HNB and to access any CS and PS services while camped on that HNB. CSG limits the subscriber to camp only onto authorized HNBs. Thus, the subscriber cannot camp on unauthorized HNBs and cannot access CS and PS services using any unauthorized HNB. Relationship between HNB spectrum and macro network spectrum: HNBs may be deployed on one or more carriers. Furthermore, the HNB deployment may either share one or more carriers with macro network or have its own dedicated carriers separate from those of macro network.

With that categorization, the HNB deployment embodiments can be the following: 1) Open association—shared carrier between macrocell and HNB; 2) Open association—dedicated carrier to HNBs; 3) CSG—shared carrier between macrocell and HNB; and 4) CSG—dedicated carrier to HNBs.

The subject innovation can develop HNB cell selection/reselection solutions applicable to the above deployment embodiments. For example, HNBs provide several motivations for operators, and these motivations can stipulate requirements on HNB cell selection/reselection. As an example, an operator may consider an HNB deployment to improve overall coverage by supplementing macro network coverage. In such a scenario, the subscriber chooses the best coverage available which can be provided by either the HNB or the macro network. Thus, the operator may not perceive a requirement to prioritize the selection of HNB over that of the macro network. Alternatively, an operator may introduce special billing plans by distinguishing services offered by HNB. In such a scenario, the subscriber will prioritize the selection of HNB over that of the macro network. The opportunity to offload traffic from macro network to HNB can also motivate such a prioritization. The subject innovation can further support the prioritization of HNBs over the macro network when sufficient quality HNB coverage is available.

Various alternate approaches toward HNB search are further summarized below: 1) Manual search: Subscriber may always rely on manual search to discover nearby HNB. 2) Neighbor set configuration: Both SIB3 and SIB11 on macro NB as well as HNB are configured to help UE discover HNB. Upon discovery, UE may prioritize HNB over macrocell. 3) Hierarchical cells: Hierarchical cells help prioritize the HNB over macro NB. Both mobility criterion and penalty timer can control HNB search and cell reselection. 4) PLMN ID allocation: Separate PLMN ID allocation for macro network and HNB network can help prioritize HNB over macro network. Further, the equivalent PLMNs can be updated dynamically for adjusting the search for the HNB. 5) Location Area Code (LAC) allocation. LAC assignment may be used to allow a UE to distinguish an authorized HNB from a nearby unauthorized HNB. 6) UE based learning: Current UEs prioritize search for recently used PLMN to reduce latency and current drain for system selection. With the introduction of HNBs, this procedure can be extended so that the UE remembers a set of HNBs that it has recently used. Furthermore, after the first discovery, UE can remember the relevant information for efficient HNB discovery later.

In Table 1 below, matching of the above approaches to the deployment embodiments and the prioritization requirement discussed above is further summarized.

TABLE 1

|  | Improve Coverage | Prioritize HNB |
| --- | --- | --- |
| Open Association | Neighbor set configuration | Hierarchical cells PLMN ID allocation |
| Close Subscriber Group |  | LAC allocation UE based learning |

As indicated in the table above, neighbor set configuration and hierarchical cells approaches affect all UEs in the coverage of the macro NBs that support these features. While in macro coverage, the UEs then search actively for the HNBs. For the CSG deployment, frequent discovery of the unauthorized HNBs can result in frequent registration attempts and degradation in standby time. In order to mitigate this impact on UEs that are not authorized on any HNB, scrambling codes allocated to HNBs can be distinguished from those assigned to macro NBs in the neighbour list and broadcast as a new SIB or an extension of an existing SIB. LAC allocation can be used to allow a UE to distinguish an authorized HNB from a nearby unauthorized HNB. Similarly, for the hierarchical cells approach one can reserve a distinct high priority for the HNBs. With that distinction, UEs not interested in HNB discovery will not search for HNBs.

To support CSG deployments, the subject innovation can mitigate impact on UEs with no HNB subscription (macro UEs) by distinguishing the HNB parameters from the macro NB parameters broadcasted in macro network. Furthermore, neighbor set configuration, hierarchical cells, as well as PLMN ID allocation approaches suit the open association deployment well. For the CSG deployment, these approaches can be complemented by relying on UE based learning. By leveraging local stored information (local database), UE can avoid fruitless registration attempts with unauthorized HNBs and search efficiently for authorized HNBs. Moreover, by implementing UE based learning, the subject innovation can improve HNB discovery.

The subject innovation can be utilized for home nodeB selection and reselection to the above mentioned deployment scenarios. Moreover, home nodeBs can be prioritized over a macro network or nodeB when sufficient quality home nodeB coverage is available. Additionally, to support CSG deployments and mitigate impact on UEs with no home nodeB subscription, a distinction between the home nodeB parameters from the macro nodeB parameters can be broadcasted in the macro network.

Moreover, although not shown, it is to be appreciated that base station 302 can include memory that retains instructions with respect to utilizing a hierarchical structure to organize at least one node base station (nodeB) and at least one home node base station (home nodeB), wherein the hierarchical structure prioritizes a home nodeB over a nodeB, receiving a portion of data related to system information block (SIB) from at least one of a nodeB and a home nodeB, wherein the SIB is configured to enable a user equipment (UE) to discover the home nodeB, communicating a detection notification related to a home nodeB to a macro network, employing at least one of the hierarchical structure or the portion of data related to SIB to enable the UE to select between the home nodeB or the nodeB, and the like. Moreover, the memory can retain instructions with respect to utilizing a manual search with the UE to discover the home nodeB, controlling a search for the home nodeB and selection of the home nodeB with a mobility factor and a penalty timer, receiving a first public land mobile network identification (PLMN ID) allocation for the home nodeB and a second public land mobile network identification identification (PLMN ID) allocation for a macro network that includes the nodeB, wherein the first PLMN ID allocation is prioritized over the second PLMN ID allocation, utilizing the first PLMN ID allocation and the second PLMN ID allocation to select between the home nodeB or the nodeB, dynamically updating two or more equivalent PLMN ID's to enable the UE to search for a home nodeB, receiving a location area code (LAC) assignment, wherein the LAC assignment is employed to distinguish an authorized home nodeB from an unauthorized home nodeB, receiving a PLMN ID for a selected home nodeB, wherein the UE established connectivity with the selected home nodeB, tracking the PLMN ID associated with the selected home nodeB, utilizing the tracked PLMN ID to select between a first home nodeB and a second home nodeB, connecting to at least one of the first home nodeB and the second home nodeB based upon the tracked PLMN ID, receiving a scrambling code associated with a home nodeB, receiving a scrambling code associated with a nodeB, evaluating a received scrambling code to identify a new SIB or an existing SIB, utilizing the evaluation to search for a nodeB, utilizing the evaluation to prevent a search for a home nodeB, and the like.

Furthermore, it is to be appreciated that base station 302 can include memory that retains instructions with respect to receiving a detection notification associated with a home node base station (home nodeB) from a user equipment (UE), wherein the detection notification identifies a home nodeB for connectivity, organizing at least one node base station (nodeB) and the at least one home nodeB within a hierarchical structure that prioritizes connectivity for the UE to the home nodeB over the nodeB, establishing connectivity between the UE and at least one of the home nodeB or the nodeB based upon one of the hierarchical structure, and the like. Moreover, the memory can retain instructions with respect to transmitting a portion of data related to a home nodeB system information block (SIB) and a portion of data related to a nodeB SIB, establishing connectivity between the UE and at least one of the home nodeB or the nodeB based upon the portion of data, communicating a public land mobile network identification (PLMN ID) related to a home nodeB and a PLMN ID related to a nodeB, establishing connectivity between the UE and at least one of the home nodeB or the nodeB based upon one the PLMN ID related to the home nodeB and the PLMN ID related to the nodeB, communicating a location area code (LAC) assignment for a home nodeB and a LAC assignment for a nodeB, establishing connectivity between the UE and at least one of the home nodeB or the nodeB based upon one the LAC assignment for the home nodeB and the LAC assignment for the nodeB, and the like. Further, base station 302 can include a processor that may be utilized in connection with executing instructions (e.g., instructions retained within memory, instructions obtained from a disparate source, . . . ).

Figure 4:
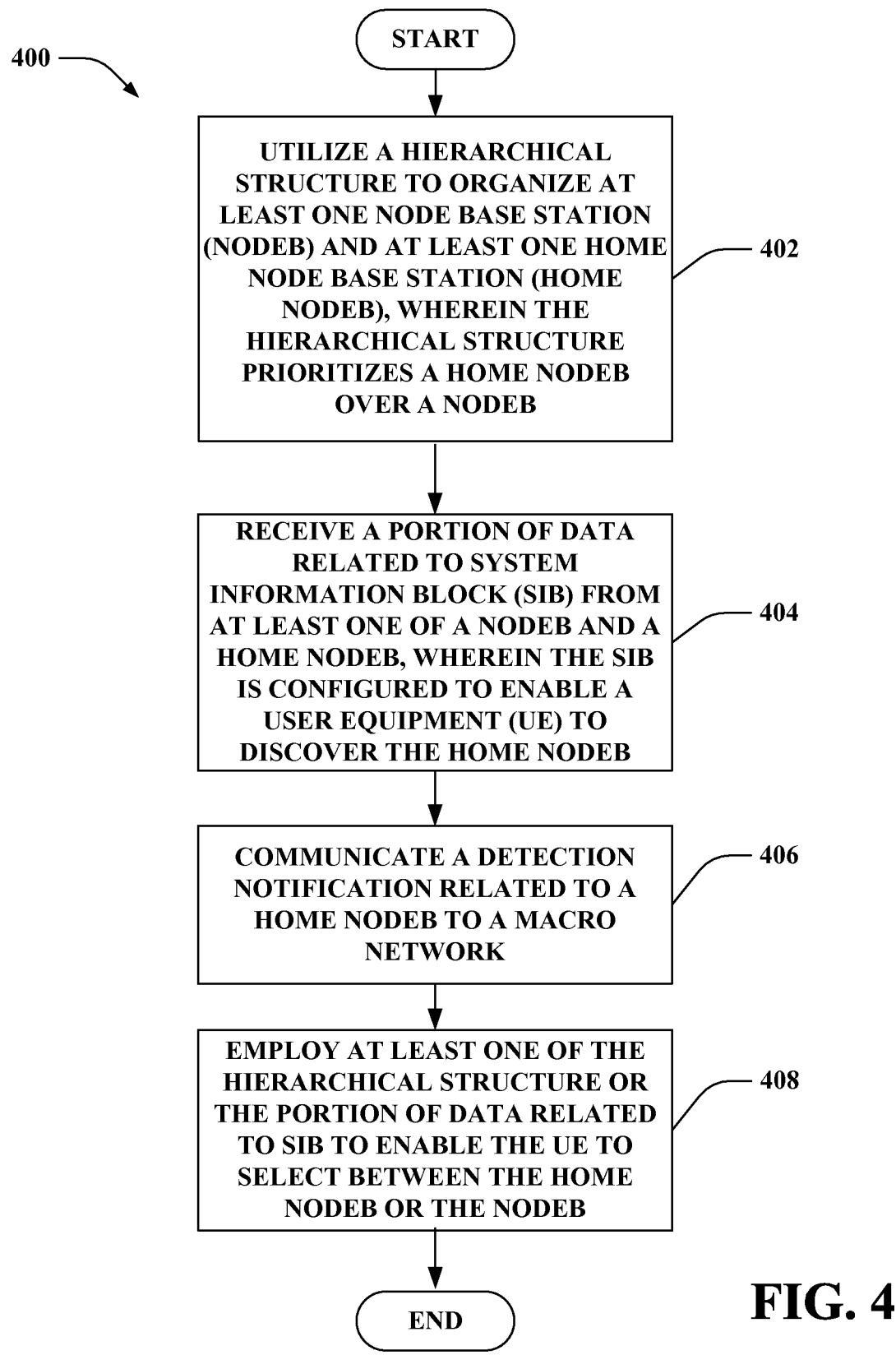
FIG. 4 is an illustration of an example methodology that enables efficient selection for a user equipment in which a home node base station is prioritized over a node base station.
Figure 5:
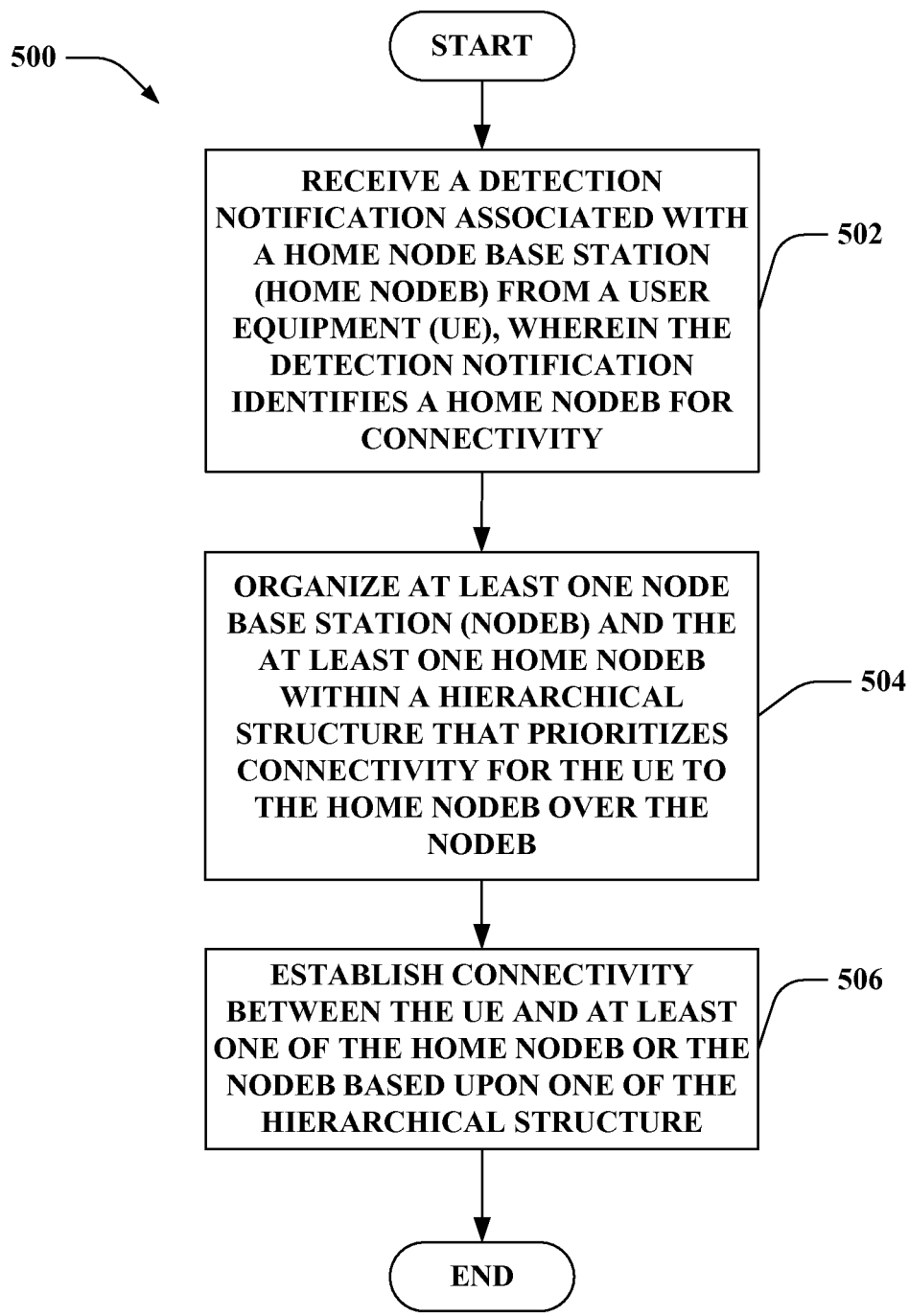
FIG. 5 is an illustration of an example methodology that communicates the detection of a home node base station for connectivity.

Referring to FIGS. 4-5, methodologies relating to configuring a flush timer are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, illustrated is a methodology 400 that facilitates efficient selection for a user equipment (UE) in which a home node base station is prioritized over a node base station. At reference numeral 402, a hierarchical structure can be utilized to organize at least one node base station (nodeB) and at least one home node base station (home nodeB), wherein the hierarchical structure prioritizes a home nodeB over a nodeB. At reference numeral 404, a portion of data related to system information block (SIB) can be received from at least one of a nodeB and a home nodeB, wherein the SIB is configured to enable a user equipment (UE) to discover the home nodeB. At reference numeral 406, a detection notification related to a home nodeB can be communicated to a macro network. At reference numeral 408, at least one of the hierarchical structure or the portion of data related to SIB can be employed to enable the UE to select between the home nodeB or the nodeB.

Moreover, the methodology 400 can include utilizing a manual search with the UE to discover the home nodeB, controlling a search for the home nodeB and selection of the home nodeB with a mobility factor and a penalty timer, receiving a first public land mobile network identification (PLMN ID) allocation for the home nodeB and a second public land mobile network identification identification (PLMN ID) allocation for a macro network that includes the nodeB, wherein the first PLMN ID allocation is prioritized over the second PLMN ID allocation, utilizing the first PLMN ID allocation and the second PLMN ID allocation to select between the home nodeB or the nodeB, dynamically updating two or more equivalent PLMN ID's to enable the UE to search for a home nodeB, receiving a location area code (LAC) assignment, wherein the LAC assignment is employed to distinguish an authorized home nodeB from an unauthorized home nodeB, receiving a PLMN ID for a selected home nodeB, wherein the UE established connectivity with the selected home nodeB, tracking the PLMN ID associated with the selected home nodeB, utilizing the tracked PLMN ID to select between a first home nodeB and a second home nodeB, connecting to at least one of the first home nodeB and the second home nodeB based upon the tracked PLMN ID, receiving a scrambling code associated with a home nodeB, receiving a scrambling code associated with a nodeB, evaluating a received scrambling code to identify a new SIB or an existing SIB, utilizing the evaluation to search for a nodeB, utilizing the evaluation to prevent a search for a home nodeB, and the like.

Now referring to FIG. 5, a methodology 500 that facilitates communicating the detection of a home node base station for connectivity. At reference numeral 502, a detection notification associated with a home node base station (home nodeB) can be received from a user equipment (UE), wherein the detection notification identifies a home nodeB for connectivity. At reference numeral 504, at least one node base station (nodeB) and the at least one home nodeB can be organized within a hierarchical structure that prioritizes connectivity for the UE to the home nodeB over the nodeB. At reference numeral 506, connectivity can be established between the UE and at least one of the home nodeB or the nodeB based upon one of the hierarchical structure.

Moreover, the methodology 500 can include transmitting a portion of data related to a home nodeB system information block (SIB) and a portion of data related to a nodeB SIB, establishing connectivity between the UE and at least one of the home nodeB or the nodeB based upon the portion of data, communicating a public land mobile network identification (PLMN ID) related to a home nodeB and a PLMN ID related to a nodeB, establishing connectivity between the UE and at least one of the home nodeB or the nodeB based upon one the PLMN ID related to the home nodeB and the PLMN ID related to the nodeB, communicating a location area code (LAC) assignment for a home nodeB and a LAC assignment for a nodeB, establishing connectivity between the UE and at least one of the home nodeB or the nodeB based upon one the LAC assignment for the home nodeB and the LAC assignment for the nodeB, and the like.

Figure 6:
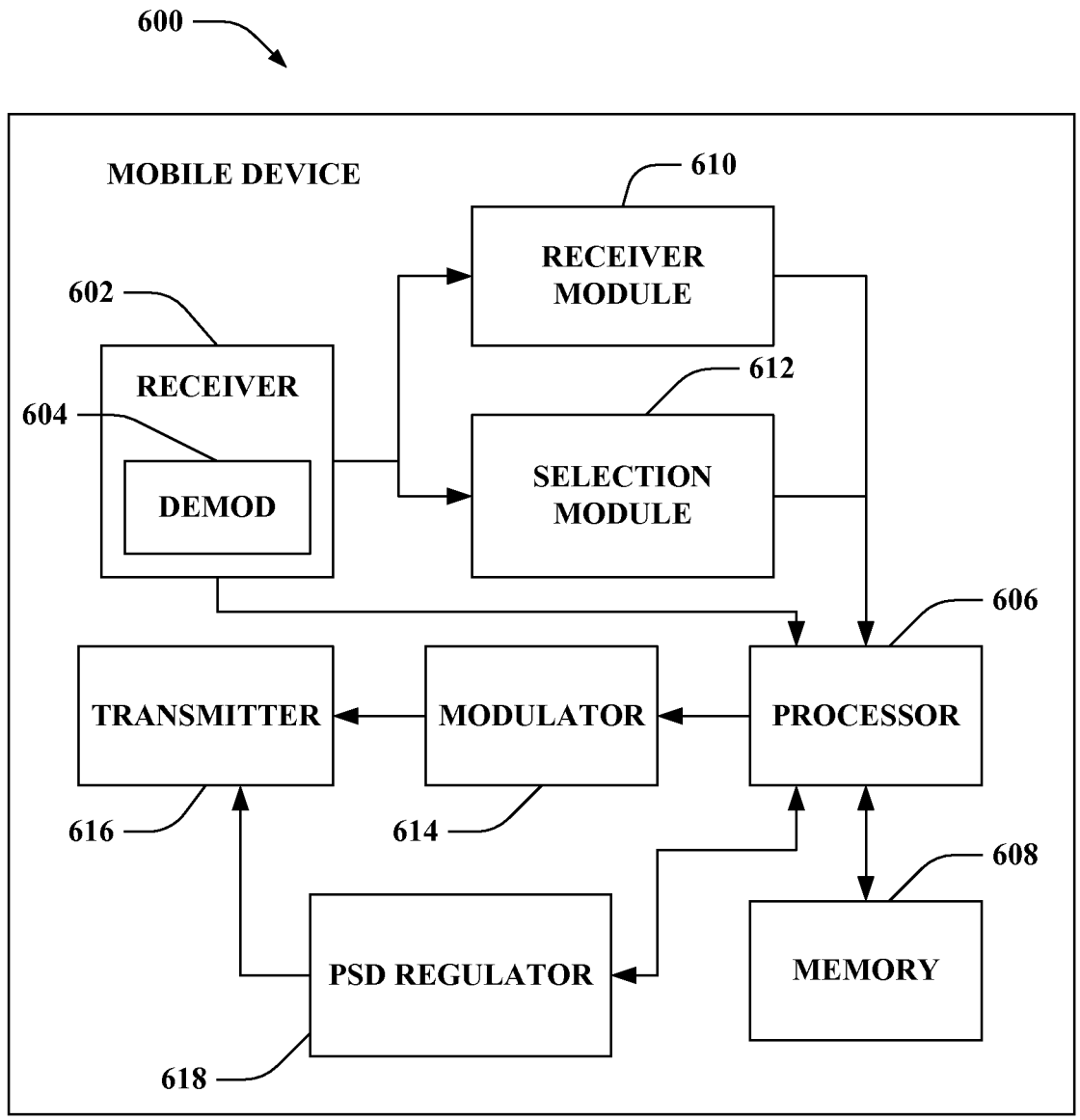
FIG. 6 is an illustration of an example mobile device that facilitates communicating information related to the detection of a home node base station in a wireless communication system.

FIG. 6 is an illustration of a mobile device 600 that facilitates communicating information related to the detection of a home node base station in a wireless communication system. Mobile device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can further be operatively coupled to at least one of a receiver module 610 or a selection module 612. The receiver module 610 can receive a portion of data (e.g., wherein the portion of data is at least one of a SIB for a home nodeB, a SIB for a nodeB, a PLMN ID for a home nodeB, a PLMN ID for a nodeB, a LAC for a home nodeB, or a LAC for a nodeB. The selection module 612 can identify at least one of a home nodeB for connectivity or a nodeB for connectivity based upon the received portion of data. Moreover, the selection module 612 can communicate the identified home nodeB to a macro network.

Mobile device 600 still further comprises a modulator 614 and transmitter 616 that respectively modulate and transmit signals to, for instance, a base station, another mobile device, etc. Although depicted as being separate from the processor 606, it is to be appreciated that the receiver module 610, selection module 612, demodulator 604, and/or modulator 614 can be part of the processor 606 or multiple processors (not shown).

Figure 7:
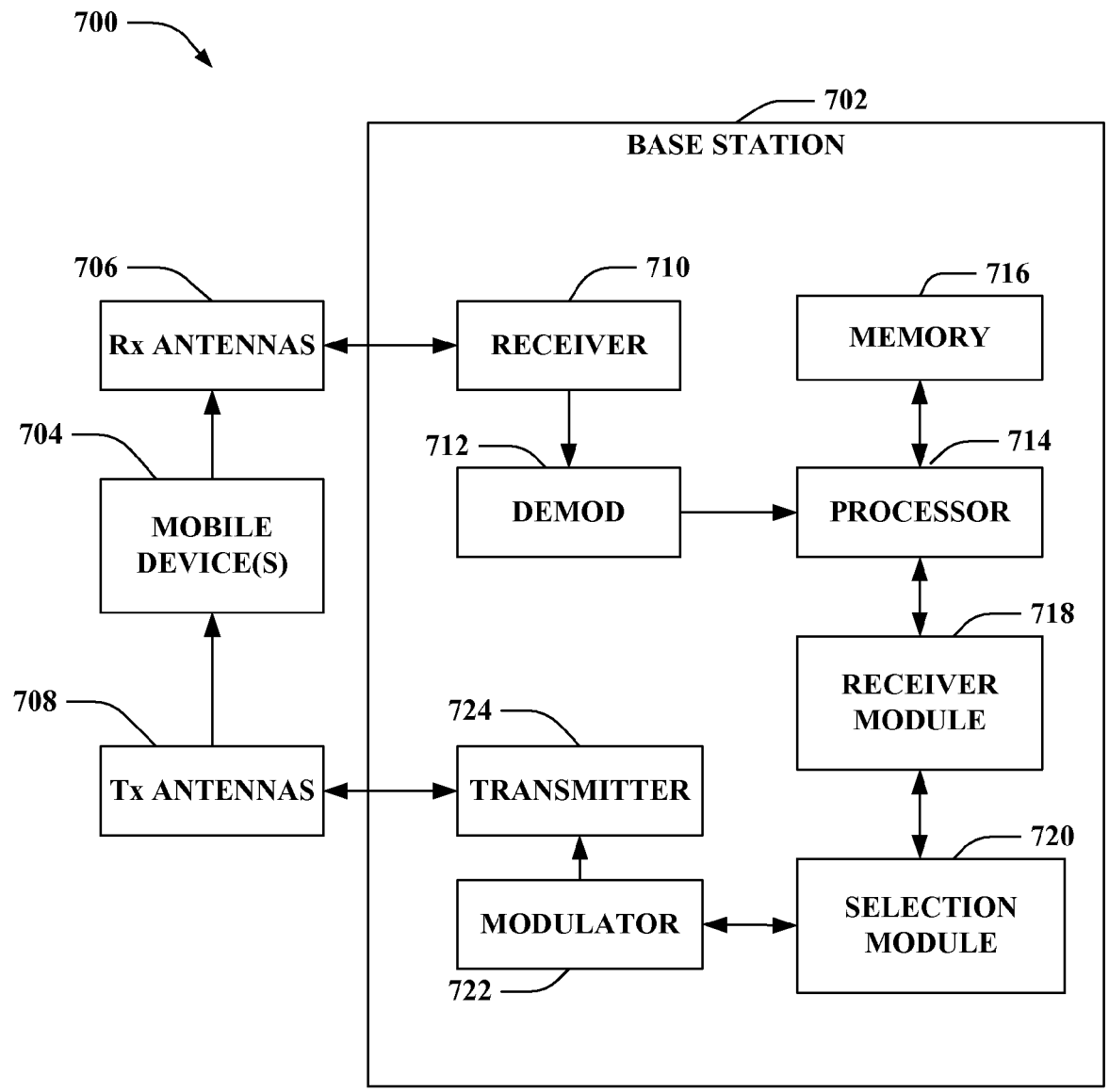
FIG. 7 is an illustration of an example system that facilitates selection of a home node base station over a node base station in a wireless communication environment.

FIG. 7 is an illustration of a system 700 that facilitates selection of a home node base station over a node base station in a wireless communication environment as described supra. The system 700 comprises a base station 702 (e.g., access point, . . . ) with a receiver 710 that receives signal(s) from one or more mobile devices 704 through a plurality of receive antennas 706, and a transmitter 724 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

Moreover, the processor 714 can be coupled to at least one of a receiver module 718 or a selection module 720. The receiver module 718 can receive a portion of data (e.g., wherein the portion of data is at least one of a SIB for a home nodeB, a SIB for a nodeB, a PLMN ID for a home nodeB, a PLMN ID for a nodeB, a LAC for a home nodeB, a detected home nodeB, or a LAC for a nodeB. The selection module 720 can identify at least one of a home nodeB for connectivity or a nodeB for connectivity based upon the received portion of data. Moreover, the selection module 720 can communicate the identified home nodeB to a UE.

Furthermore, although depicted as being separate from the processor 714, it is to be appreciated that the receiver module 718, selection module 720, demodulator 712, and/or modulator 722 can be part of the processor 714 or multiple processors (not shown).

Figure 8:
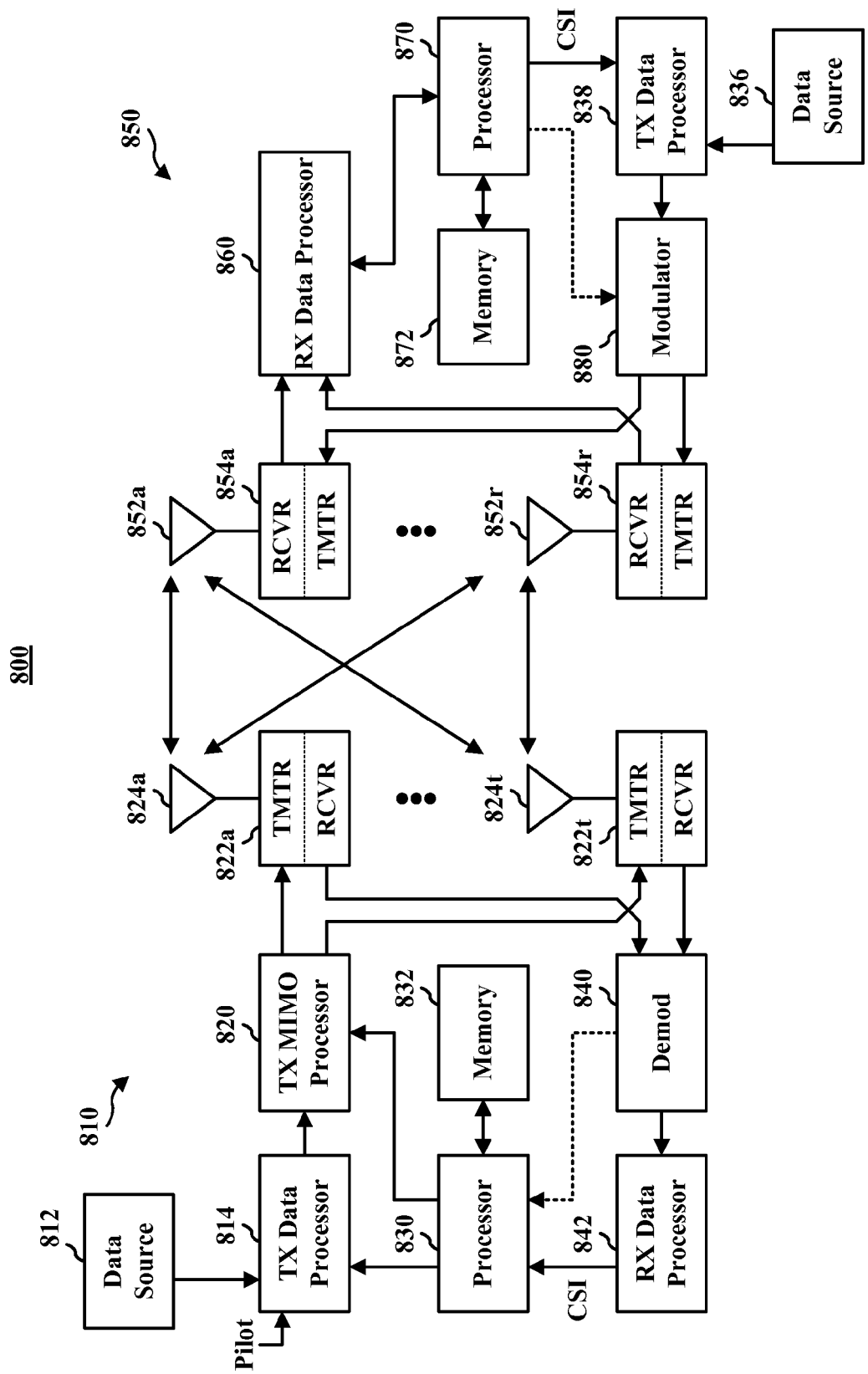
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3 and 6-7) and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which preceding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which preceding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
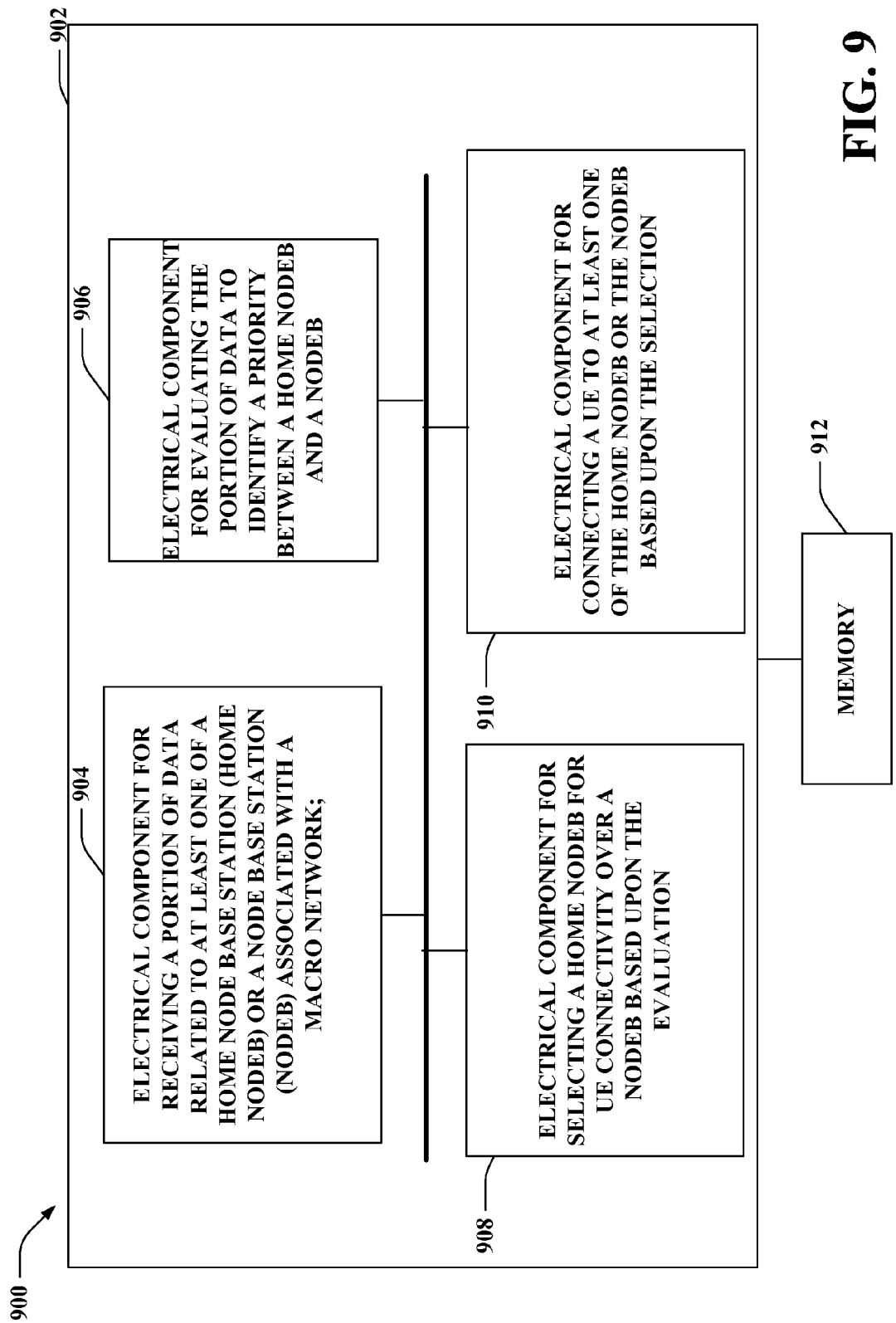
FIG. 9 is an illustration of an example system that facilitates efficient selection for a user equipment in which a home node base station is prioritized over a node base station.

With reference to FIG. 9, illustrated is a system 900 that facilitates efficient selection for a user equipment (UE) in which a home node base station is prioritized over a node base station. For example, system 900 can reside at least partially within a base station, a user equipment (UE), a mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. The logical grouping 902 can include an electrical component for receiving a portion of data related to at least one of a home node base station (home nodeB) or a node base station (nodeB) associated with a macro network 904. In addition, the logical grouping 902 can comprise an electrical component for evaluating the portion of data to identify a priority between a home nodeB and a nodeB 906. Moreover, the logical grouping 902 can include an electrical component for selecting a home nodeB for UE connectivity over a nodeB based upon the evaluation 908. The logical grouping 902 can include an electrical component for connecting a UE to at least one of the home nodeB or the nodeB based upon the selection 910. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 912.

Figure 10:
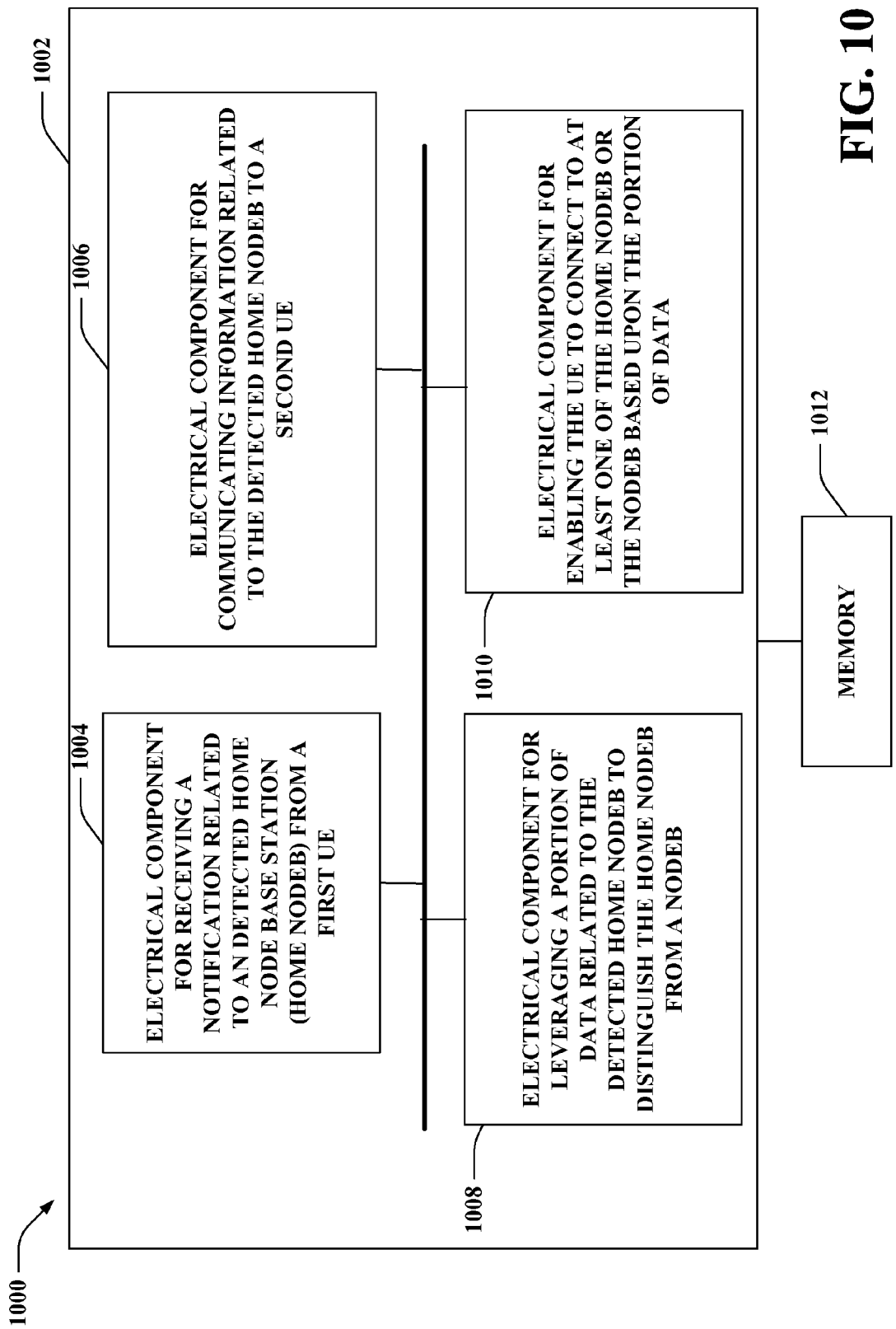
FIG. 10 is an illustration of an example system that can communicates the detection of a home node base station for connectivity.

Turning to FIG. 10, illustrated is a system 1000 that can request UPH measurements from a UE at a reduced measurement period for an E-DCH transmission. System 1000 can reside within a base station, a user equipment (UE), a mobile device, etc., for instance. As depicted, system 1000 includes functional blocks that can represent functions implemented by a processor, software, or combination thereof (e.g., firmware). System 1000 includes a logical grouping 1002 of electrical components that facilitate cell search and selection related to a home nodeB. The logical grouping 1002 can include an electrical component for receiving a notification related to an detected home node base station (home nodeB) from a first UE 1004. In addition, the logical grouping 1002 can comprise an electrical component for communicating information related to the detected home nodeB to a second UE 1006. Furthermore, the logical grouping 1002 can include an electrical component for leveraging a portion of data related to the detected home nodeB to distinguish the home nodeB from a nodeB 1008. The logical grouping 1002 can include an electrical component for enabling the UE to connect to at least one of the home nodeB or the nodeB based upon the portion of data 1010. Additionally, system 1000 can include a memory 1012 that retains instructions for executing functions associated with electrical components 1004, 1006, 1008, and 1010. While shown as being external to memory 1012, it is to be understood that electrical components 1004, 1006, 1008, 1010 can exist within memory 1012.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
utilizing a hierarchical structure to organize at least one node base station (nodeB) and at least one home node base station (home nodeB), wherein the hierarchical structure prioritizes a home nodeB over a nodeB;
receiving a portion of data related to a system information block (SIB) from at least one of a nodeB and a home nodeB, wherein the SIB is configured to enable a user equipment (UE) to discover the home nodeB;
communicating a detection notification related to a home nodeB to a macro network;
employing at least one of the hierarchical structure or the portion of data related to the SIB to enable the UE to select between the home nodeB or the nodeB;
receiving a public land mobile network identification (PLMN ID) for a selected home nodeB, wherein the UE established connectivity with the selected home nodeB;
tracking the PLMN ID associated with the selected home nodeB;
utilizing the tracked PLMN ID to select between a first home nodeB and a second home nodeB; and
connecting to at least one of the first home nodeB and the second home nodeB based upon the tracked PLMN ID.

2. The method of claim 1, further comprising utilizing a manual search with the UE to discover the home nodeB.

3. The method of claim 1, further comprising controlling a search for the home nodeB and selection of the home nodeB with a mobility factor and a penalty timer.

4. The method of claim 1, further comprising:
receiving a first PLMN ID allocation for the home nodeB and a second PLMN ID allocation for a macro network that includes the nodeB, wherein the first PLMN ID allocation is prioritized over the second PLMN ID allocation; and
utilizing the first PLMN ID allocation and the second PLMN ID allocation to select between the home nodeB or the nodeB.

5. The method of claim 4, further comprising dynamically updating two or more equivalent PLMN ID's to enable the UE to search for a home nodeB.

6. The method of claim 1, further comprising receiving a location area code (LAC) assignment, wherein the LAC assignment is employed to distinguish an authorized home nodeB from an unauthorized home nodeB.

7. The method of claim 1, further comprising:
receiving a scrambling code associated with a home nodeB;
receiving a scrambling code associated with a nodeB;
evaluating a received scrambling code to identify a new SIB or an existing SIB;
utilizing the evaluation to search for a nodeB; or
utilizing the evaluation to prevent a search for a home nodeB.

8. A wireless communications apparatus, comprising:
at least one processor configured to:
organize at least one node base station (nodeB) and at least one home node base station (home nodeB) into a hierarchical structure that prioritizes a home nodeB over a nodeB;
receive a communication that includes a system information block (SIB) from at least one of a nodeB and a home nodeB;
leverage the SIB to identify the home nodeB;
utilize a manual search with a user equipment (UE) to discover the home nodeB;
evaluate a public land mobile network identification (PLMN ID) to identify at least one of the home nodeB or the nodeB;
receive a location area code (LAC) assignment to distinguish an authorized home nodeB from an unauthorized home nodeB;
communicate a detection notification related to a home nodeB to a macro network;
employ at least one of the hierarchical structure, the communication that includes the SIB, the PLMN ID, the manual search, or the LAC assignment to enable the UE to select between the home nodeB or the nodeB;
receive a PLMN ID for a selected home nodeB, wherein the UE established connectivity with the selected home nodeB;
tracking the PLMN ID associated with the selected home nodeB;
utilize the tracked PLMN ID to select between a first home nodeB and a second home nodeB; and
connect to at least one of the first home nodeB and the second home nodeB based upon the tracked PLMN ID; and
a memory coupled to the at least one processor.

9. The wireless communications apparatus of claim 8, further comprising:
at least one processor configured to:
receive a scrambling code associated with a home nodeB;
receive a scrambling code associated with a nodeB;
evaluating a received scrambling code to identify a new SIB or an existing SIB;
utilize the evaluation to search for a nodeB; or
utilize the evaluation to prevent a search for a home nodeB.

10. A computer program product, comprising:
a non-transitory computer-readable medium comprising:
code for causing at least one computer to organize at least one node base station (nodeB) and at least one home node base station (home nodeB) into a hierarchical structure that prioritizes a home nodeB over a nodeB;
code for causing at least one computer to receive a communication that includes a system information block (SIB) from at least one of a nodeB and a home nodeB;
code for causing at least one computer to leverage the SIB to identity the home nodeB;
code for causing at least one computer to utilize a manual search with a user equipment (UE) to discover the home nodeB;
code for causing at least one computer to evaluate a public land mobile network identification (PLMN ID) to identify at least one of the home nodeB or the nodeB;
code for causing at least one computer to receive a location area code (LAC) assignment to distinguish an authorized home nodeB from an unauthorized home nodeB;
code for causing at least one computer to communicate a detection notification related to a home nodeB to a macro network;
code for causing at least one computer to employ at least one of the hierarchical structure, the communication that includes the SIB, the PLMN ID, the manual search, or the LAC assignment to enable the UE to select between the home nodeB or the nodeB;

code for causing at least one computer to receive a PLMN ID for a selected home nodeB, wherein the UE established connectivity with the selected home nodeB;
code for causing at least one computer to record the PLMN ID associated with the selected home nodeB;
code for causing at least one computer to utilize the recorded PLMN ID to select between a first home nodeB and a second home nodeB; and
code for causing at least one computer to connect to at least one of the first home nodeB and the second home nodeB based upon the recorded PLMN ID.

11. The computer program product of claim 10, further comprising:
a non-transitory computer-readable medium comprising:
code for causing at least one computer to assign a home nodeB with at least one of a new SIB or an existing SIB;
code for causing at least one computer to receive a scrambling;
code associated with at least one of a home nodeB or a nodeB;
code for causing at least one computer to search for a nodeB based upon the received scrambling code; and
code for causing at least one computer to prevent a search for a home nodeB based upon the received scrambling code.

12. A method, comprising:
receiving a detection notification associated with a home node base station (home nodeB) from a user equipment (UE), wherein the detection notification identifies a home nodeB for connectivity;
organizing at least one node base station (nodeB) and at least one home nodeB within a hierarchical structure that prioritizes connectivity for the UE to the home nodeB over the nodeB;
establishing connectivity between the UE and at least one of the home nodeB or the nodeB based upon the hierarchical structure;
communicating a public land mobile network identification (PLMN ID) for a selected home nodeB, wherein the UE established connectivity with the selected home nodeB, and wherein the UE tracks the PLMN ID of the selected home nodeB; and
establishing connectivity between the UE and a first home nodeB or a second home nodeB based upon the tracked PLMN ID.

13. The method of claim 12, further comprising:
transmitting a portion of data related to a home nodeB system information block (SIB) and a portion of data related to a nodeB SIB; and
establishing connectivity between the UE and at least one of the home nodeB or the nodeB based upon the portions of data.

14. The method of claim 12, further comprising:
communicating a PLMN ID related to a home nodeB and a PLMN ID related to a nodeB; and
establishing connectivity between the UE and at least one of the home nodeB or the nodeB based upon one the PLMN ID related to the home nodeB and the PLMN ID related to the nodeB.

15. The method of claim 12, further comprising:
communicating a location area code (LAC) assignment for a home nodeB and a LAC assignment for a nodeB; and
establishing connectivity between the UE and at least one of the home nodeB or the nodeB based upon one the LAC assignment for the home nodeB and the LAC assignment for the nodeB.

16. A wireless communications apparatus, comprising:
at least one processor configured to:
receive a detection notification associated with a home node base station (home nodeB) from a user equipment (UE), wherein the detection notification identifies a home nodeB for connectivity;
organize at least one node base station (nodeB) and at least one home nodeB within a hierarchical structure that prioritizes connectivity for the UE to the home nodeB over the nodeB;
establish connectivity between the UE and at least one of the home nodeB or the nodeB based upon one of the hierarchical structure;
communicate a public land mobile network identification (PLMN ID) for a selected home nodeB, wherein the UE established connectivity with the selected home nodeB, and wherein the UE tracks the PLMN ID of the selected home nodeB; and
establish connectivity between the UE and a first home nodeB or a second home nodeB based upon the tracked PLMN ID; and
a memory coupled to the at least one processor.

17. The wireless communications apparatus of claim 16, further comprising:
at least one processor configured to:
leverage at least one of a location area code (LAC) assignment, a PLMN ID, or a system information block (SIB) to establish connectivity between the UE and at least one of the home nodeB or the nodeB.

18. A computer program product, comprising:
a non-transitory computer-readable medium comprising:
code for causing at least one computer to receive a detection notification associated with a home node base station (home nodeB) from a user equipment (UE), wherein the detection notification identifies a home nodeB for connectivity;
code for causing at least one computer to organize at least one node base station (nodeB) and at least one home nodeB within a hierarchical structure that prioritizes connectivity for the UE to the home nodeB over the nodeB;
code for causing at least one computer to enable connectivity between the UE and at least one of the home nodeB or the nodeB based upon one of the hierarchical structure;
code for causing at least one computer to communicate a public land mobile network identification (PLMN ID) for a selected home nodeB, wherein the LIE established connectivity with the selected home nodeB, and wherein the UE tracks the PLMN ID of the selected home nodeB; and
code for causing at least one computer to establish connectivity between the UE and a first home nodeB or a second home nodeB based upon the tracked PLMN ID.

19. The computer program product of claim 18, wherein the non-transitory computer-readable medium further comprises:
code for causing at least one computer to leverage at least one location area code (LAC) assignment, a PLMN ID, or a system information block (SIB) to enable connectivity between the UE and at least one of the home nodeB or the nodeB.

20. An apparatus, comprising:
a receiver module that receives a detection notification associated with a home node base station (home nodeB) from a user equipment (UE);

an organizer module that utilizes a hierarchical structure to organize at least one node base station (nodeB) and at least one home nodeB, wherein the hierarchical structure prioritizes a detected home nodeB over a nodeB; and a transmitter module that communicates a portion of data to the UE, wherein the portion of data is at least one of a system information block (SIB) for a home nodeB, a SIB for a nodeB, a public land mobile network identification (PLMN ID) for a home nodeB, a PLMN ID for a nodeB, a location area code (LAC) for a home nodeB, or a LAC for a nodeB, and wherein the transmitter module further communicates a PLMN ID for a selected home nodeB, wherein the UE established connectivity with the selected home nodeB, wherein the UE tracks the PLMN ID of the selected home nodeB, and wherein the UE connects to a first home nodeB or a second home nodeB based upon the tracked PLMN ID for the selected home nodeB.

21. The apparatus of claim 20, wherein the UE connects to at least one of the detected home nodeB or the nodeB based upon the communicated portion of data.

\* \* \* \* \*